United States Patent [19]
Dougan et al.

[11] Patent Number: 5,329,277
[45] Date of Patent: Jul. 12, 1994

[54] DISPLAYS AND DISPLAY SYSTEMS

[75] Inventors: Keith G. Dougan; Peter F. O'Sullivan, both of Cheltenham, England

[73] Assignee: Smiths Industries Public Limited Company, London, England

[21] Appl. No.: 78,064

[22] Filed: Jun. 18, 1993

Related U.S. Application Data

[63] Continuation of Ser. No. 799,839, Dec. 2, 1991, abandoned.

[30] Foreign Application Priority Data

Dec. 5, 1990 [GB] United Kingdom ............... 9026451

[51] Int. Cl.5 .............................................. G01C 23/00
[52] U.S. Cl. ....................................... 340/971; 340/973
[58] Field of Search ............... 340/971, 977, 979, 973, 340/961, 701, 734; 364/439; 342/36, 44

[56] References Cited

U.S. PATENT DOCUMENTS

| Re. 25,756 | 4/1958 | Balding | 340/971 |
|---|---|---|---|
| 3,258,743 | 6/1966 | Schuster | 340/971 |
| 3,668,403 | 6/1972 | Meilander | 340/440 |
| 3,750,166 | 7/1973 | Dearth | 342/44 |
| 4,368,517 | 1/1983 | Lovering | 340/972 |
| 4,513,378 | 4/1985 | Antkowiak | 364/452 |
| 4,581,612 | 4/1986 | Jones | 340/791 |
| 4,646,244 | 2/1987 | Bateman | 340/963 |
| 4,768,036 | 8/1988 | Litchford et al. | 342/455 |

FOREIGN PATENT DOCUMENTS 0370640  5/1990  European Pat. Off. .
9001202  2/1990  PCT Int'l Appl. .
886136   1/1962  United Kingdom .

OTHER PUBLICATIONS

Northstar M1, Northstar Avionics, Jan. 1987.
"Automatic Traffic Advisory and Resolution Service (Atars) The Design of a Ground-Based Solution to Midair Collisions" by J. A. Scardina, Wescon Conference Record, vol. 24, No. 7/2 (1980).

Primary Examiner—Hezron E. Williams
Assistant Examiner—Christine K. Oda
Attorney, Agent, or Firm—Pollock, Vande Sande and Priddy

[57] ABSTRACT

An aircraft display system has a display unit comprising a matrix array of LED's mounted in the glareshield. Air traffic command signals received by a datalink processor produce a visual indication on the display unit which is visible to the pilot when looking through the window. A button on the display unit is pressed by the pilot to acknowledge receipt of instructions. Other important messages are displayed by the display unit at different times. Radar altimeter height is displayed in a color which changes when the aircraft descends below its flare height. When on the ground, the display unit displays alphanumerically the distance-to-go to the end of the runway, and simultaneously displays stripes that move horizontally to indicate deviation of the aircraft from the runway center line.

1 Claim, 2 Drawing Sheets

DISPLAYS AND DISPLAY SYSTEMS

This application is a continuation of Ser. No. 07/799,839, filed on Dec. 2, 1991, now abandoned.

BACKGROUND OF THE INVENTION

This invention relates to aircraft displays and display systems.

Aircraft have many displays which present a variety of information to the pilot. When the pilot's attention needs to be drawn to information of particular importance, it can be difficult to ensure that he is able to distinguish this important information from other information. It has been proposed in GB 2226924A to mount a display in the glareshield of an aircraft to present information to the pilot from a (Tactical Collision Avoidance Systems) collision avoidance system. The display is of a kind that produces changing symbols so that these are visible in the peripheral field-of-view of the pilot while he is looking forwardly through the aircraft window.

There is, however, other information which it is desirable to present to the pilot which does not necessarily have to be interpreted by the pilot when looking through the aircraft window. It has been found that it is very advantageous to present this information to the pilot on a display located in the region of the glareshield, because such a location is separate from the other aircraft instruments and is closest to the external field-of-view through the window.

BRIEF SUMMARY OF THE INVENTION

It is an object of the present invention to provide an improved aircraft display system.

According to one aspect of the present invention there is provided an aircraft display system including a datalink receiver arranged to receive air traffic command instructions from a source remote from the aircraft, processing means arranged to receive an output from said receiver and to generate display driver signals in accordance therewith, a visual display unit being mounted in the region of the glareshield of the aircraft, the display unit receiving the output of the processing means and providing a visual display representation of the air traffic command instructions, and the processing unit being arranged to generate a response signal in response to acknowledgement of the air traffic command instructions.

The system may include a manually-operable member which is actuable to provide the acknowledgement. The manually-operable member may be a control on the display unit. The system may include an autopilot unit that is connected with the processing means such that change in setting of the autopilot unit provides acknowledgement of the air traffic command instructions and causes the processing means to generate the response signal. The visual display unit may be switchable to display one of the following instead of the air traffic command instructions: collision avoidance information, ground roll information and radar altimeter information. The system may include means for providing an output signal representative of aircraft attitude, the processing means being arranged to receive the attitude output and providing a display driver signal that produces on the display unit a visual display representation of symbols moving horizontally along the display in a direction and at a rate dependent on the displacement of the aircraft from the runway center line. The symbols may be stripes. The system may include means for providing an output signal indicative of distance-to-go of the aircraft from a point on the runway, the processing means being arranged to provide display driver signals that generate on the display unit a numerical representation of the distance-to-go. The display driver signals generated by the processing means may provide a display of alphanumeric information of a variable value on the visual display unit, the alphanumeric information being represented in one color on a contrasting background when the value is in a predetermined range, and the alphanumeric representation and or alternatively the background being changed in color when the value falls outside the range so that the viewer's attention is drawn to the display unit. The system may include a radar providing radar altimeter information, the color change being produced when the height of the aircraft falls below a predetermined height. The processing means may be arranged to provide radar altimeter information on the visual display unit prior to touch down and then to provide information about displacement of the aircraft from the runway center line.

The visual display unit preferably includes a matrix of electrically-energizable elements which may be LED's.

According to another aspect of the present invention there is provided a visual display unit for a display system according to the above one aspect of the present invention.

A multi-function aircraft display system in accordance with the present invention, will now be described, by way of example, with reference to the accompanying drawings.

DESCRIPTION OF THE PREFERRED EMBODIMENTS

Figure 1:
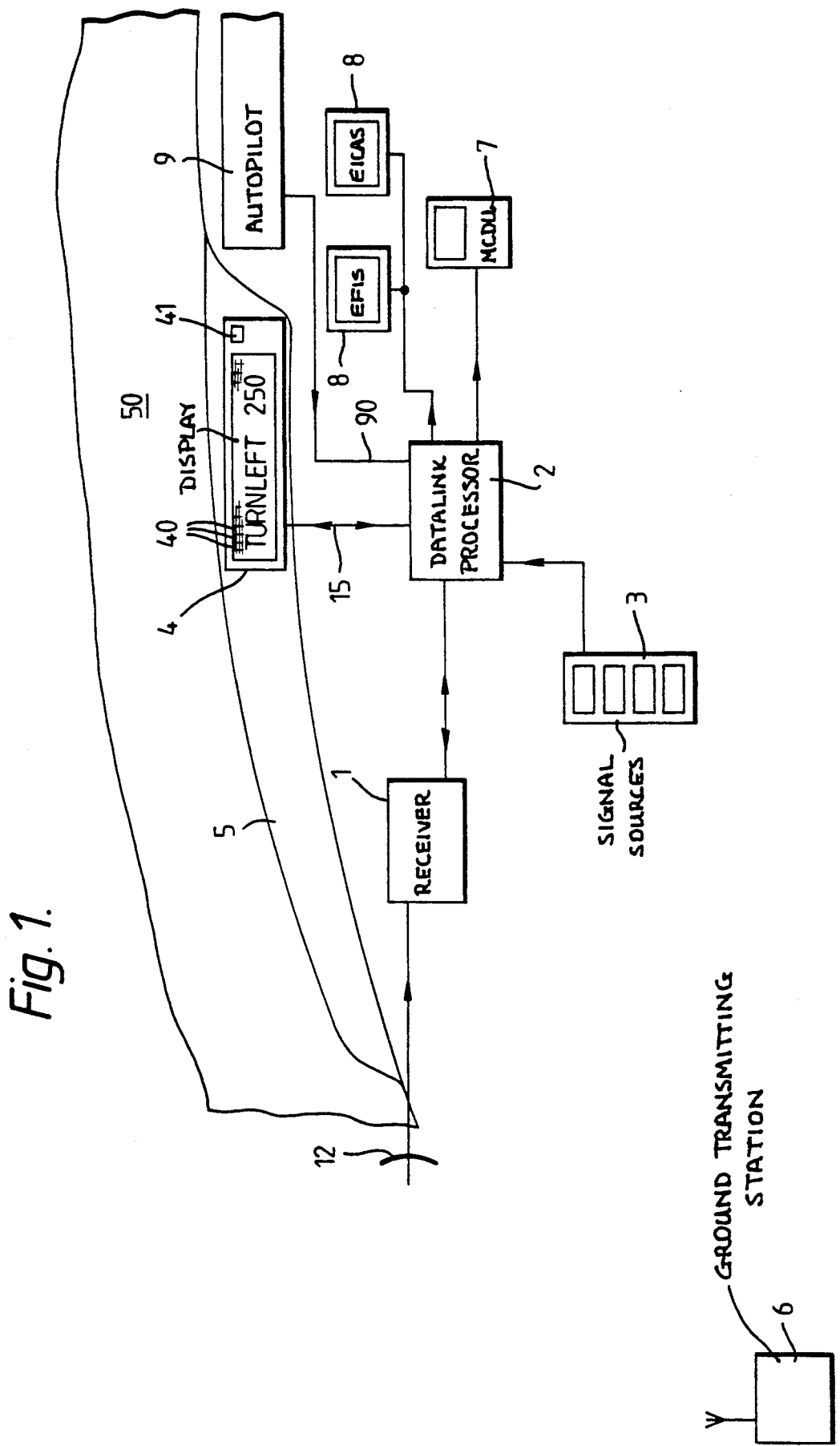
FIG. 1 shows the system schematically.

The display system includes a receiver 1 connected to a datalink processor 2, which also receives inputs from various other sources 3, and provides an output signal to drive a display unit 4 mounted in the aircraft glareshield 5 immediately below the forward window 50 of the aircraft.

The receiver 1 receives radio transmissions via an aerial 12 and supplies an output to an input of the datalink processor 2. The datalink processor 2 provides a display driver signal on line 15 to the display unit 4 which causes the display unit to provide a visual display in alphanumeric form of the signals received by the receiver 1 from a transmitting station 6 on the ground. The transmitting station 6 transmits air traffic control commands to identified aircraft so as to control movement of aircraft, for example, in and around airports and when taxing on the ground. In the example shown, the air traffic control signal is for the aircraft to turn left to a heading of 250 degrees. This is displayed on the unit 4 by the legend "TURN LEFT 250".

The display unit 4 has a matrix array of LED's 40 which may be of different colors so as to enable display representations to be in different colors. Typically, the usable size of the display unit 4 is about 20 cm wide by 3 cm high which is sufficient to enable short messages to be displayed with high visibility.

The display unit 4 is not dedicated to display of air traffic control information but is used to display several different forms of important information of the kind having an immediate effect on the flight path of the aircraft. The use of the display unit 4 is confined to these important messages, other messages being displayed on the aircraft's MCDU (multi-function control display unit) 7 or on the EFIS/EICAS (electronic flight instrumentation system/engine indication and crew alerting system) 8. In this way, the pilot knows that, when a message appears on the display unit 4, it must be acted on with priority. The location of the display unit 4 in the glareshield 5 means that any change in the appearance of the unit is immediately apparent in the peripheral field of view of the pilot when he is looking forwardly through the aircraft window 50, or inside at the main instrument panels. The display unit 4 has an optional acknowledge button 41, or other manually-operable control, which the pilot presses when he has entered the new heading in the aircraft's autopilot 9. This causes a signal to be sent from the display unit 4 to the processor 2, and from there to the receiver 1 which transmit a message to the ground station 6, to acknowledge that the command signals have been acted on. Alternatively, the autopilot 9 may have a direct link 90 to the processor 2 so that the act of entering in a new heading to the autopilot automatically causes the acknowledge signal to be transmitted to the ground station 6.

In addition to the air traffic command signals, the display unit 4 displays (at different times) the following information: TCAS, collison avoidance instruction; ground roll guidance with distance-to-go information; and radar altimeter with flare height information.

The TCAS information is presented in the same manner as described in GB 2226924A.

Figure 2:
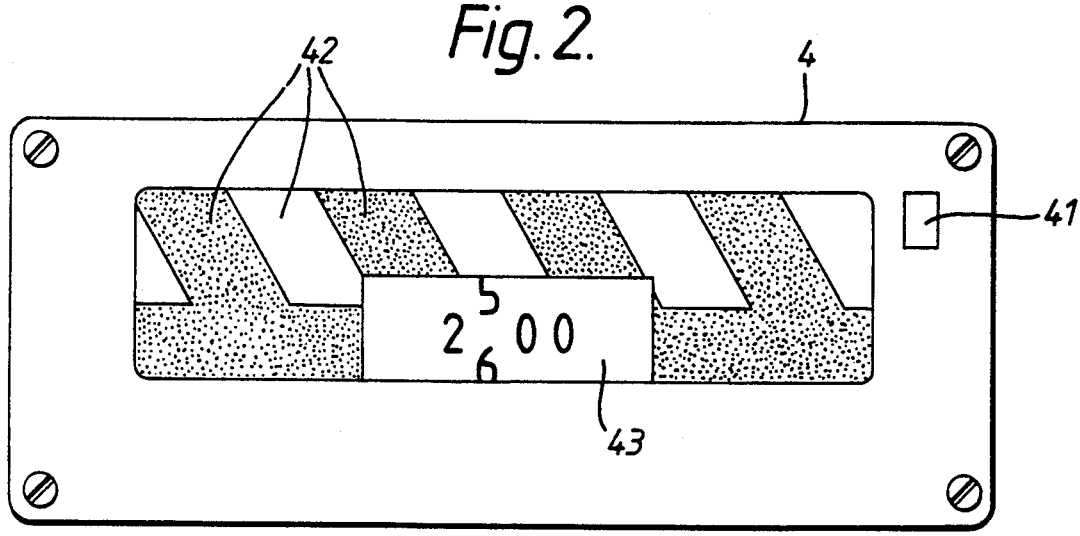
FIG. 2 shows a display provided by the system.

The ground roll guidance and distance-to-go information is presented in the format shown in FIG. 2. The upper part of the display has a series of alternate bright and dark inclined stripes 42 that move left-to-right or right-to-left across the screen of the unit 4 according to the displacement of the aircraft relative to the center line of the runaway after the aircraft has landed. If the aircraft is to the right of the center line, the stripes 42 move the left; if the aircraft is to the left of the center line, the stripes move the right. The rate of movement of the stripes is dependent on the amount of deviation. When central, the stripes are stationary. Similar forms of indicator have been previously provided using a rotating pole having a helical stripe that appears to move along the pole as it is rotated. Centrally in the lower part of the display screen, there is represented a box 43 within which appears the distance-to-go to the end of the runway. In the present example, this is between 2500 ft and 2600 ft. This format is displayed after landing, especially during low visibility, so that the pilot can maintain a central path along the runway without having to look directly at the display itself. The distance-to-go can be determined by glancing down to the display.

The information needed to generate this display format is supplied to the datalink processor 2 from the group of sensors or sources 3 which include an ILS, instrument landing system that provides aircraft attitude information and information about the aircraft's distance-to-go to the end of the runway.

Figure 3A:
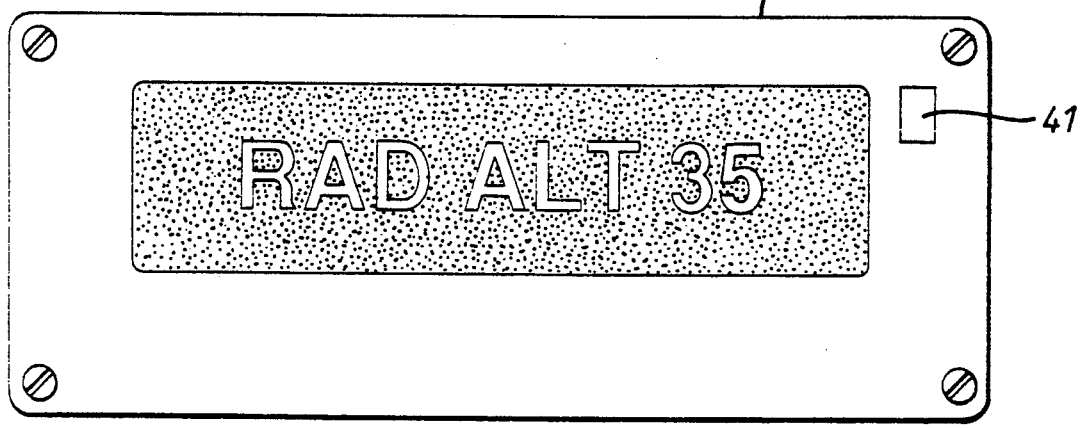
FIGS. 3a and 3b show alternative displays.
Figure 3B:
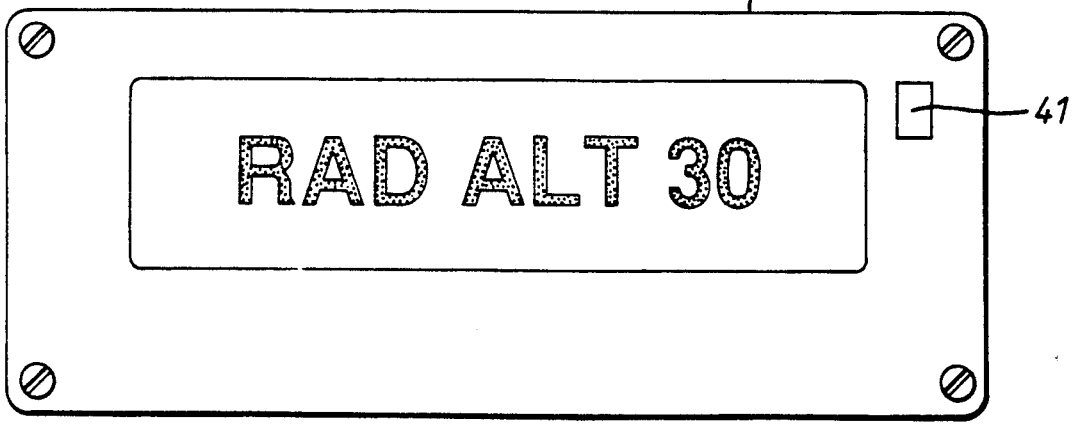

The radar altimeter information is provided in the form shown in FIGS. 3A and 3B. The system is preset with the aircraft flare height, that is the height at which the aircraft should start to be flared from its descent to its landing pitch attitude. In this example, the flare height is 30 ft. Above the flare height, the display unit 4 presents a legend such as "RAD ALT 35" in bright letters against a dark background, as in FIG. 3A, to indicate that the radar altimeter reads a height of 35 ft. When the flare height of 30 ft is reached, as detected by a radar altimeter sensor in the group of sources 3, the display format changes to dark letters against a bright background, as in the lower display "RAD ALT 30" in FIG. 3B. The pilot is, therefore, immediately made aware that the aircraft has gone below the flare height without having to look directly at the display, because the change in appearance is visible in the pilot's peripheral field of view. The display might typically represent the radar altimeter information until touch down and then switch automatically to the ground roll display. This might be followed by a representation of ground movement commands received from the groundstation 6.

Various other important information could be represented additionally or alternatively in the display unit 4.

What we claim is:

1. An aircraft display system comprising a visual display unit mounted in the glareshield of an aircraft and including an array of electrically-energizable elements, a processing unit, means for providing a first signal to said processing unit representative of aircraft attitude, means for providing a second signal to said processing unit representative of distance-to-go of the aircraft from a point on a runway to the end of the runway, said processing unit being responsive to said first and second signals to provide a display driver signal to said display unit after the aircraft has landed to cause said array of elements to produce an alphanumeric representation taking the form of symbols moving horizontally in a direction and at a rate dependent on displacement of the aircraft from a runway centerline and a simultaneous numerical representation of said distance-to-go, said alphanumeric representation being in one color on a contrasting background when the variable value of information being displayed is in a predetermined range, and the color of at least one of the alphanumeric representation and the contrasting background being changed when the variable value of information being displayed falls outside said predetermined range so that a viewer's attention is drawn to the display unit as a whole by said change in color.

* * * * *